United States Patent [19]
Bogdanowicz et al.

[11] Patent Number: 6,122,006
[45] Date of Patent: Sep. 19, 2000

[54] METHOD FOR PREVIEWING A SCENE BEFORE ACTUAL CAPTURE BY A MOTION-PICTURE CAMERA

[75] Inventors: Mitchell J. Bogdanowicz, Spencerport; Christopher L. Dumont, Rochester; Christian L. Lurin, Webster, all of N.Y.; Patrick J. Parsons-Smith, Hertfordshire, United Kingdom

[73] Assignee: Eastman Kodak Company, Rochester, N.Y.

[21] Appl. No.: 09/018,082

[22] Filed: Feb. 3, 1998

[51] Int. Cl.[7] ................................................. H04N 5/228
[52] U.S. Cl. ........................... 348/222; 348/576; 348/223; 382/162; 358/527
[58] Field of Search ............................. 348/97, 222, 223, 348/655, 576; 352/6, 12, 31; 358/527; 382/162

[56] References Cited

U.S. PATENT DOCUMENTS

| | | | |
|---|---|---|---|
| 4,958,220 | 9/1990 | Alessi et al. | 358/76 |
| 5,374,954 | 12/1994 | Mowry | 348/121 |
| 5,594,513 | 1/1997 | Stone et al. | 352/6 |
| 5,687,011 | 11/1997 | Mowry | 358/527 |
| 5,764,306 | 6/1998 | Steffano | 348/576 |
| 5,828,406 | 10/1998 | Parulski et al. | 348/220 |
| 5,841,512 | 11/1998 | Goodhill | 352/56 |
| 5,874,988 | 2/1999 | Gu | 349/97 |
| 5,917,987 | 6/1999 | Neyman | 386/42 |

*Primary Examiner*—William A. Cuchlinski, Jr.
*Assistant Examiner*—Marthe Marc-Coleman
*Attorney, Agent, or Firm*—Peyton C. Watkins

[57] ABSTRACT

A method for previewing a scene before actual capture by a motion-picture camera for permitting improved creative control of the scene ultimately captured by the motion-picture camera, the method comprises the steps of providing a digital representation of the scene; mapping the digital representation through a transfer function which maps the digital representation to image data representative of image data that a predetermined film will create; providing the mapped image data to a display; and displaying the image data on the display.

27 Claims, 4 Drawing Sheets

METHOD FOR PREVIEWING A SCENE BEFORE ACTUAL CAPTURE BY A MOTION-PICTURE CAMERA

FIELD OF THE INVENTION

The invention relates generally to the field of motion picture and, more particularly, to a method for previewing a scene before actual capture by a motion picture camera for permitting improved creative control of the motion-picture captured scene.

BACKGROUND OF THE INVENTION

Today, there are numerous film stocks available to choose from for a video or motion picture production. Each of these film stocks has its own unique set of characteristics and capabilities, which ultimately influences the appearance of the captured scene. Currently, time-consuming testing is performed to assure that the producers, director and cinematographer all agree on the intended result that the film will ultimately create.

Present methods for testing include filming a representative scene and exposing the film under a variety of conditions which the cinematographer thinks will result in the captured scene having the desired appearance. The film is then processed and printed for viewing by the producers, director and cinematographer. If the results are not as expected, the testing procedure is repeated until the desired appearance is obtained.

Although the presently known and utilized system and method for creating motion picture are satisfactory, they are not without drawbacks. The above-described system and method for previewing of the film before actual filming is time consuming and costly. Consequently, a need exists for a method, system and/or a computer program product for overcoming the above-described drawbacks.

SUMMARY OF THE INVENTION

The present invention is directed to overcoming one or more of the problems set forth above. Briefly summarized, according to one aspect of the present invention, the invention resides in a method for previewing a scene before actual capture by a motion-picture camera for permitting improved creative control of the scene ultimately captured by the motion-picture camera, the method comprising the steps of: (a) providing a digital representation of the scene; (b) mapping the digital representation through a transfer function which maps the digital representation to image data representative of image data that a predetermined film will create; (c) providing the mapped image data to a display; and (d) displaying the image data on the display.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of permitting the user to preview a scene on a real-time basis under a variety of conditions before actually filming the scene so that cost is minimized and time-consuming, nonreal-time testing is eliminated.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
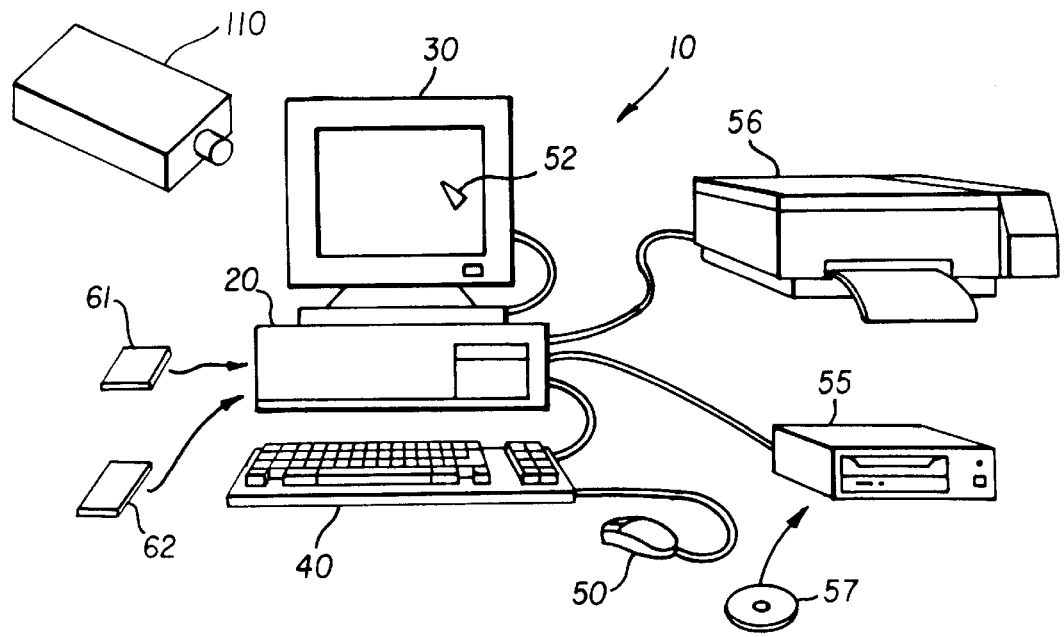
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A display 30 is electrically connected to the microprocessor based unit 20 for displaying user related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor based unit 20 for permitting visual display of the image on the display 30. Before proceeding further, it is first instructive to have a basic understanding of the process by which digitized images are typically formed.

Figure 2:
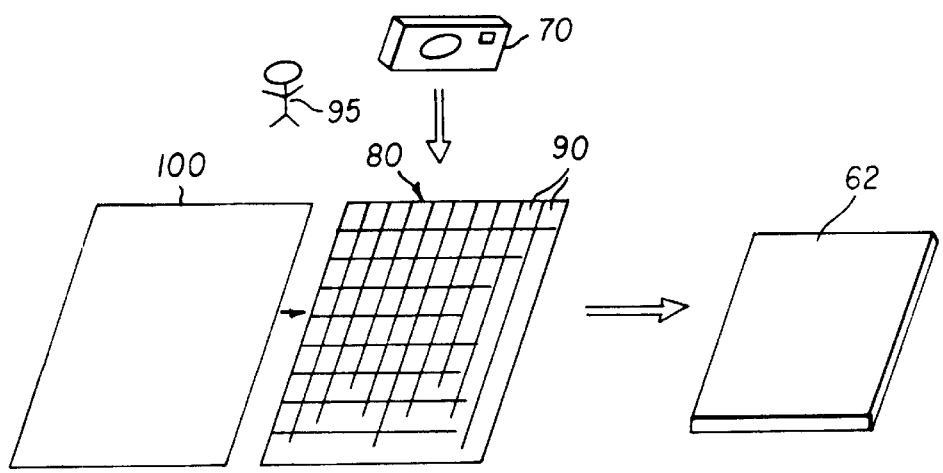
FIG. 2 is an illustration of capturing an image by digital camera.

In this regard, and referring to FIG. 2, a digital camera 70 includes a charge-coupled device (CCD) 80 having a plurality of pixels 90 for capturing the optical incident image 95. Any color filter array 100, such as a Bayer array, is placed over the CCD 80 for permitting a color representation of the image 95 (colored filter array image or CFA image) to be captured by the pixels 90, as is well known in the art. The pixels 90 convert the incident optical energy into a plurality of values, typically ranging from 0–4095. The image 95 is then stored electronically on the PC card 62 for permitting later retrieval by well known computer devices.

Figure 3:
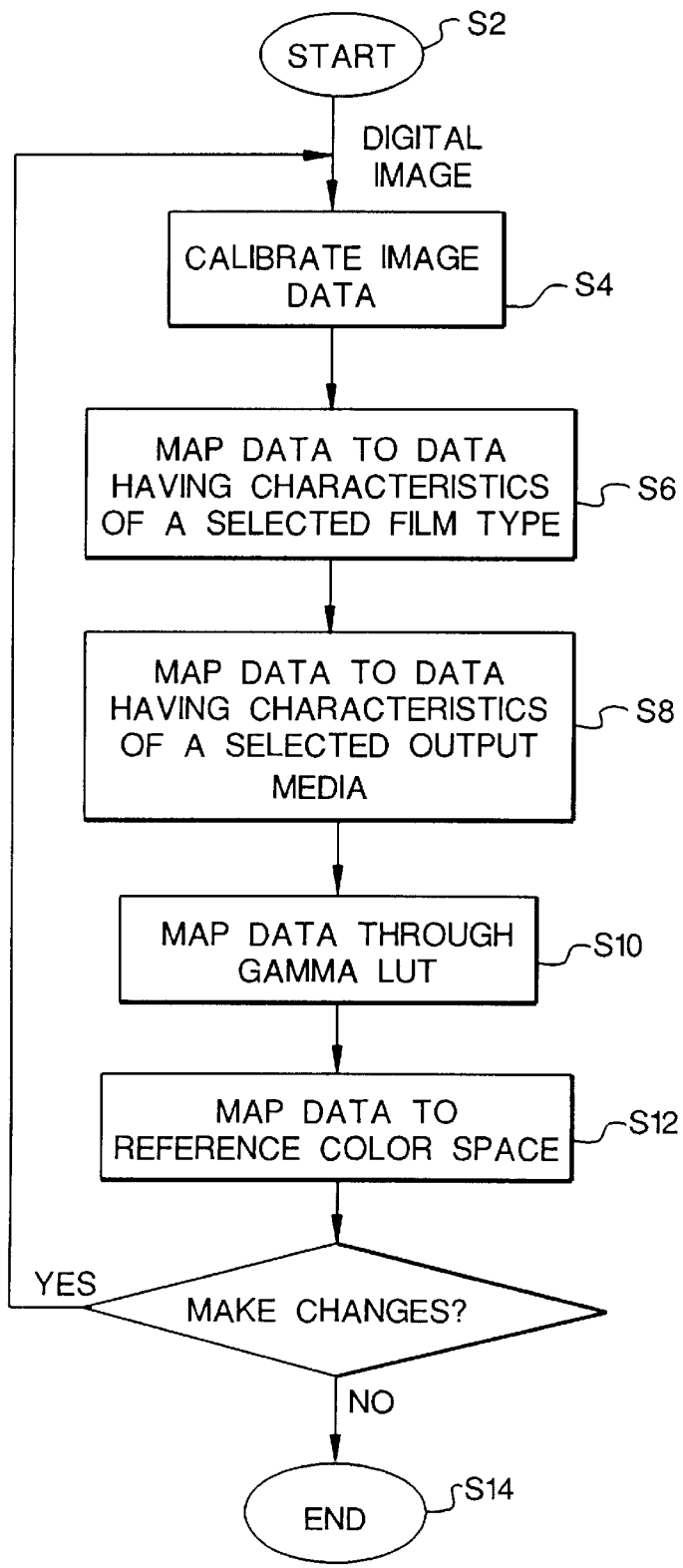
FIG. 3 is a flowchart illustrating the software program of the present invention.

Referring to FIG. 3, there is illustrated a flowchart of a software program of the present invention. The software is initiated S2 and it then retrieves and stores the digital representation of the captured image in random access memory (RAM) so that a portion of or the entire digital representation can accessed for processing by the software as necessary. The entire digital representation is then calibrated S4 for accounting for the unique spectral response of the image capture device, for example the digital camera 70 in the preferred embodiment. Each device includes a unique spectral response which should be compensated for permitting the emulation of the spectral response of the film; such spectral response calibration can be readily accomplished by those skilled in the art.

Figure 4:
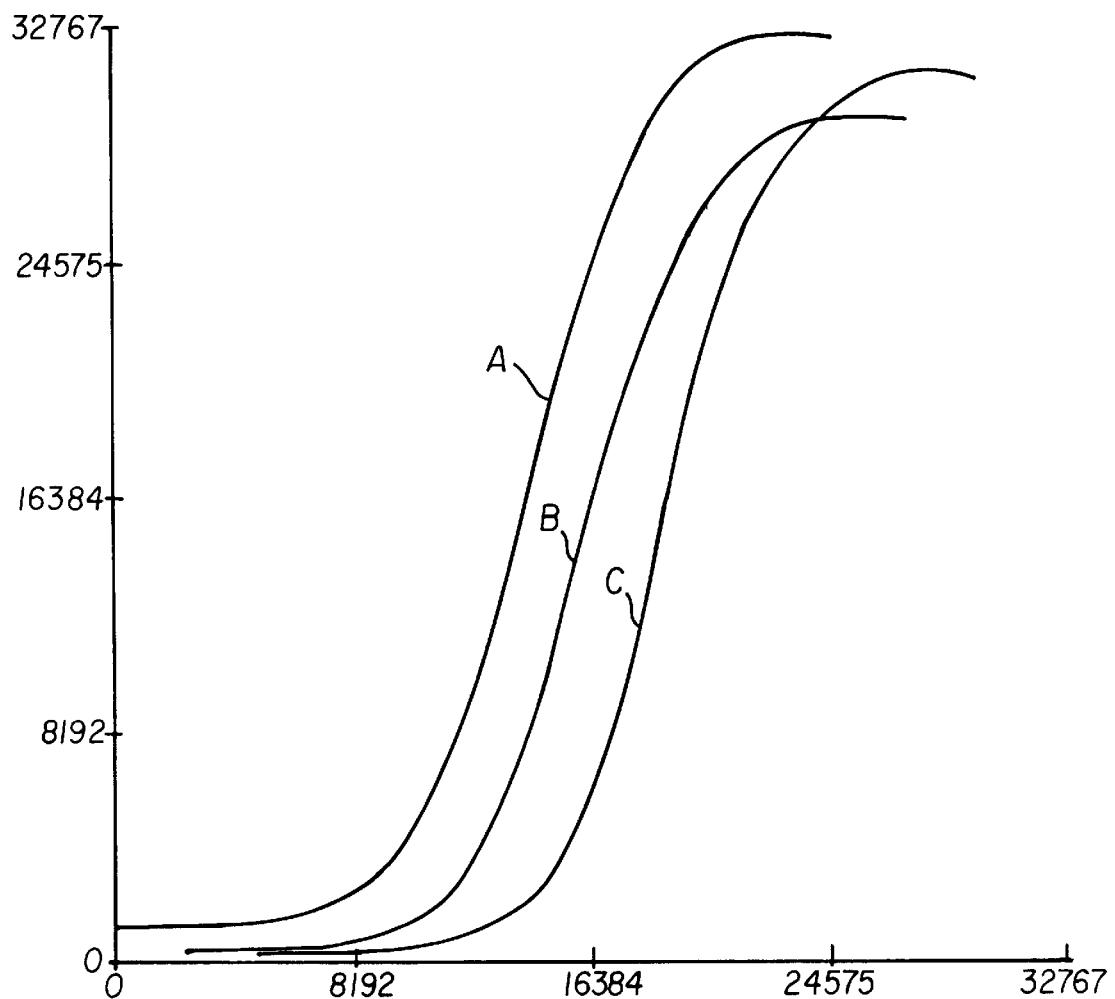
FIG. 4 is a graph illustrating a transfer function for a typical film on which motion-pictures are captured.

Next, the user selects the particular type of film that will be simulated by the software S6. The calibrated image data is then processed through that particular film characteristic lookup table (LUT) for compensating for the type of film that will ultimately be used in the motion-picture camera; those skilled in the art will recognize each particular film type will have its own LUT. Examples of types of film are "KODAK" 5245, 5246, 5248, 5277, 5293, 5279, 5274, 5298, and 5620 film. Referring to FIG. 4, there is illustrated a graph for 5274-type film that may be used to create the LUT for this film type; the abscissa is the input pixel values and the ordinate is the output pixel values. It is instructive to note that each pixel will have a plurality of pixel values that correspond to each color channel being used, typically three—red, green and blue. Therefore, each input color channel will use a different function or curve; in this regard, curve A is for the blue color channel, curve B is for the green color channel, and curve C is for the red color channel. These curves can be created from actual test data by those skilled in the art.

Figure 5:
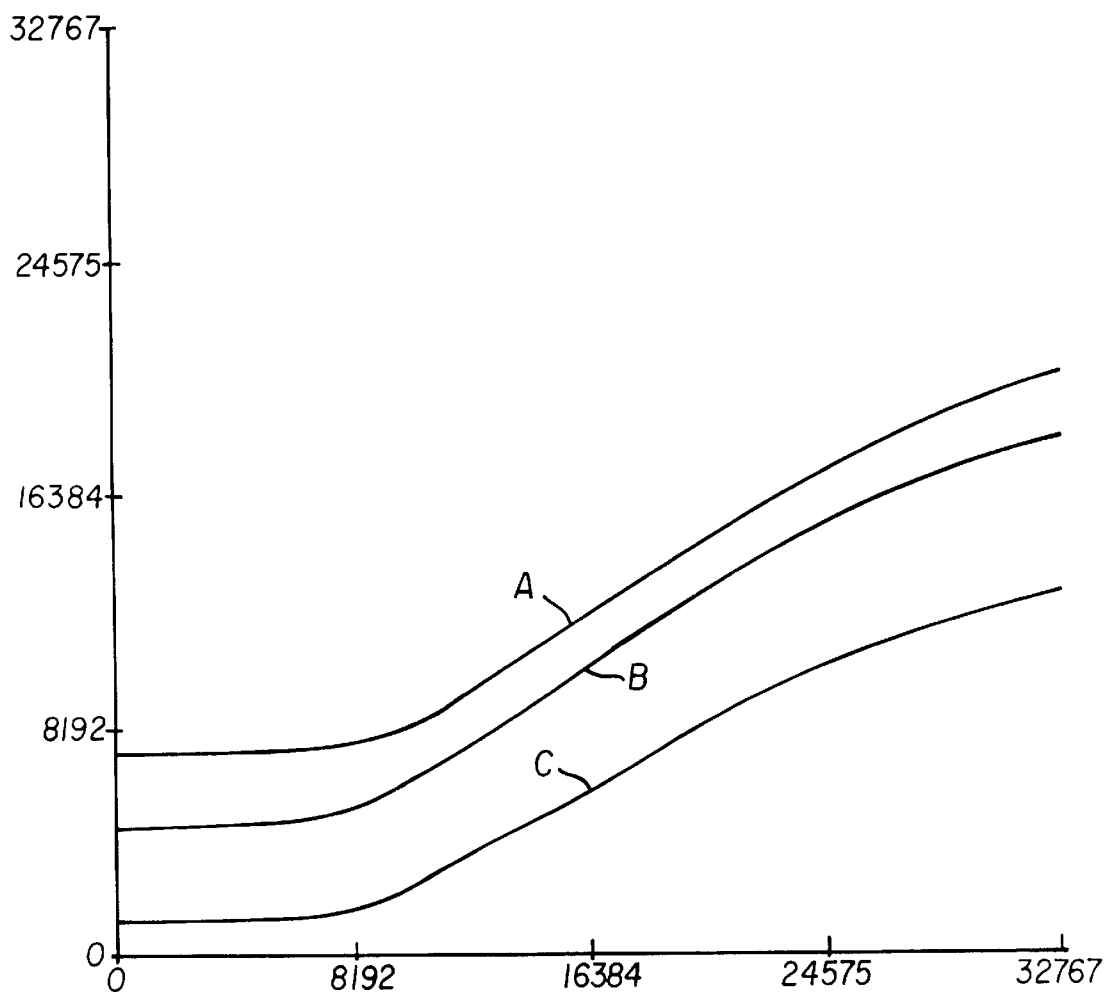
FIG. 5 is a graph illustrating a transfer function for a typical output media on which motion-pictures are projected.

Referring back to FIG. 3, next, the user selects the particular type of output media that will be simulated by the software S8. The image data is then processed through that particular output media LUT for compensating for the type of media on which the previously selected film will project the captured images for permitting viewing of the motion picture; those skilled in the art will recognize each particular output media type will have its own LUT. Example of output media type are "KODAK" 5381, 5386 film and well-known black and white film. Referring to FIG. 5, there is illustrated a graph for 5386-type output that may be used to create the LUT for this output-media type; again, the abscissa is the input pixel values and the ordinate is the output pixel values. As stated above, it is instructive to note that each pixel will have a plurality of pixel values that correspond to each color channel being used, typically three—red, green and blue. Therefore, each input color channel will use a different function or curve; curve A is for the blue color channel, curve B is for the green color channel, and curve C is for the red color channel. The curves can be created from actual test data by those skilled in the art.

Referring again to FIG. 3, the image data is then passed through an output gamma LUT for compensating for gamma effects of the computer display 30 on which the simulated image will be displayed S10. Computer monitors (and certain other display devices) display linear image data with logarithmic brightness. This gamma effect is compensated for by the gamma LUT, which effect is also called logarithmic compensation. It causes a linear gray scale to be perceived by the human eye as linear. Nonlinear perception exists in the human eye and nonlinear display in the computer monitor, and this correction LUT is used to compensate for it. Gamma correction attempts to establish a linear relationship between the numerical value in a color record, and the resulting luminance (intensity) on the computer display screen (or other display device).

Finally, the image data is converted to a standard reference color space, such as CIELAB, for permitting the data to have a common reference space from which the display device can convert to its particular color space S12. The image data is then passed to the color module of the microprocessor-based unit 20 which converts the image data to the color space of the particular display. The display 30 then displays the image thereon.

The user may then end the software program S14, if the desired look is obtained, or repeat the above-described process as many times as necessary for altering any of the selections until the desired look of the simulated image is obtained. After this, and referring again to FIG. 1, the user then uses a motion-picture camera 110 to capture the scene using the same film as selected by the user in the simulated software for obtaining the desired look on the motion-picture film. Obviously, the same output media will also be used for obtaining the predetermined desired appearance.

The invention has been described with reference to a preferred embodiment. However, it will be appreciated that variations and modifications can be effected by a person of ordinary skill in the art without departing from the scope of the invention. For instance, an, filter, print process and the like may be simulated before actual capture by a motion-picture camera.

What is claimed is:

1. A method for previewing a real-life scene before actual capture by a motion-picture camera for permitting improved creative control of the scene ultimately captured by the motion-picture camera, the method comprising the steps of:

(a) capturing a digital representation of the real-life scene with a digital camera;

(b) mapping the digital representation through a first transfer function to obtain a further digital representation of image data representative of image data that a predetermined motion picture film will create under a variety of exposure conditions, including at least one of different camera exposure levels and different camera filtrations;

(c) mapping the further digital representation through a second transfer function to obtain output image data representative of image data that a predetermined motion picture output media will create;

(d) providing the output image data to a display; and (e) displaying the output image data on the display.

2. The method as claimed in claim 1 in which step (a) further comprises calibrating the digital representation for a spectral response of the digital camera in order to emulate the spectral response of the motion picture film.

3. The method as claimed in claim 1 in which the motion picture film and the motion picture output media are color materials each having several color channels and the mapping performed in steps (b) and (c) are performed with different mapping functions for each color channel.

4. The method as claimed in claim 1 further comprising the step of mapping the output image data through an output gamma function in order to provide corrected output image data to the display.

5. The method as claimed in claim 1 further comprising the step of converting the output image data to a standard reference color space from which the display can convert to its particular color space.

6. The method as claimed in claim 1 in which the mapping of the further digital representation in step (c) to obtain output image data representative of image data that a predetermined motion picture output media will create further includes the mapping of the further digital representation to account for different print processes.

7. The method as claimed in claim 1 in which the mapping of the further digital representation in step (c) to obtain output image data representative of image data that a predetermined motion picture output media will create further includes the mapping of the further digital representation to account for different print color balance conditions.

8. A computer program product for previewing a real-life scene with a digital camera before actual capture by a motion-picture camera for permitting improved creative control of the scene ultimately captured by the motion-picture camera, comprising a computer readable storage medium having a computer program stored thereon for performing the steps of:
   (a) providing a digital representation of the real-life scene captured by the digital camera;
   (b) mapping the digital representation through a first transfer function to obtain a further digital representation of image data representative of image data that a predetermined motion picture film will create under a variety of exposure conditions, including at least one of different camera exposure levels and different camera filtrations;
   (c) mapping the further digital representation through a second transfer function to obtain output image data representative of image data that a predetermined motion picture output media will create;
   (d) providing the output image data to a display; and
   (e) displaying the output image data on the display.

9. The computer program product as claimed in claim 8 in which step (a) further comprises calibrating the digital representation for a spectral response of the digital camera in order to emulate the spectral response of the motion picture film.

10. The computer program product as claimed in claim 8 in which the motion picture film and the motion picture output media are color materials each having several color channels and the mapping performed in steps (b) and (c) are performed with different mapping functions for each color channel.

11. The computer program product as claimed in claim 8 further comprising the step of mapping the output image data through an output gamma function in order to provide corrected output image data to the display.

12. The computer program product as claimed in claim 8 further comprising the step of converting the output image data to a standard reference color space from which the display can convert to its particular color space.

13. The computer program product as claimed in claim 8 in which the mapping of the further digital representation in step (c) to obtain output image data representative of image data that a predetermined motion picture output media will create further includes the mapping of the further digital representation to account for different print processes.

14. The computer program product as claimed in claim 8 in which the mapping of the further digital representation in step (c) to obtain output image data representative of image data that a predetermined motion picture output media will create further includes the mapping of the further digital representation to account for different print color balance conditions.

15. A method for previewing a real-life scene before actual capture by a motion-picture camera for permitting improved creative control of the scene ultimately captured by the motion-picture camera, the method comprising the steps of:
   (a) capturing a digital representation of the real-life scene with a digital camera and calibrating the digital representation for a spectral response of the digital camera in order to emulate the spectral response of the motion picture film;
   (b) mapping the digital representation through a first transfer function to obtain a further digital representation of image data representative of image data that a predetermined motion picture film will create under a variety of exposure conditions;
   (c) mapping the further digital representation through a second transfer function to obtain output image data representative of image data that a predetermined motion picture output media will create;
   (d) providing the output image data to a display; and
   (e) displaying the output image data on the display.

16. The method as claimed in claim 15 in which the motion picture film and the motion picture output media are color materials each having several color channels and the mapping performed in steps (b) and (c) are performed with different mapping functions for each color channel.

17. The method as claimed in claim 15 further comprising the step of mapping the output image data through an output gamma function in order to provide corrected output image data to the display.

18. The method as claimed in claim 15 further comprising the step of converting the output image data to a standard reference color space from which the display can convert to its particular color space.

19. The method as claimed in claim 15 in which the mapping of the digital representation in step (b) to obtain the further digital representation of image data that a predetermined motion picture film will create under a variety of exposure conditions includes the mapping of the digital representation to account for at least one of different camera exposure levels and different camera filtrations.

20. The method as claimed in claim 15 in which the mapping of the further digital representation in step (c) to obtain output image data representative of image data that a predetermined motion picture output media will create further includes the mapping of the further digital representation to account for different print processes.

21. The method as claimed in claim 15 in which the mapping of the further digital representation in step (c) to obtain output image data representative of image data that a predetermined motion picture output media will create further includes the mapping of the further digital representation to account for different print color balance conditions.

22. A method for previewing a real-life scene before actual capture by a motion-picture camera for permitting improved creative control of the scene ultimately captured by the motion-picture camera, the method comprising the steps of:
   (a) capturing a digital representation of the real-life scene with a digital camera;

(b) mapping the digital representation through a first transfer function to obtain a further digital representation of image data representative of image data that a predetermined motion picture film will create under a variety of exposure conditions;

(c) mapping the further digital representation through a second transfer function to account for at least one of different print processes and different print color balance conditions and thereby obtain output image data representative of image data that a predetermined motion picture output media will create;

(d) providing the output image data to a display; and (e) displaying the output image data on the display.

23. The method as claimed in claim 22 in which step (a) further comprises calibrating the digital representation for a spectral response of the digital camera in order to emulate the spectral response of the motion picture film.

24. The method as claimed in claim 22 in which the motion picture film and the motion picture output media are color materials each having several color channels and the mapping performed in steps (b) and (c) are performed with different mapping functions for each color channel.

25. The method as claimed in claim 22 further comprising the step of mapping the output image data through an output gamma function in order to provide corrected output image data to the display.

26. The method as claimed in claim 22 further comprising the step of converting the output image data to a standard reference color space from which the display can convert to its particular color space.

27. The method as claimed in claim 22 in which the mapping of the digital representation in step (b) to obtain the further digital representation of image data that a predetermined motion picture film will create under a variety of exposure conditions includes the mapping of the digital representation to account for at least one of different camera exposure levels and different camera filtrations.

* * * * *